US008527190B2

(12) United States Patent
Mere et al.

(10) Patent No.: US 8,527,190 B2
(45) Date of Patent: Sep. 3, 2013

(54) METHOD AND SYSTEM FOR AIDING THE TAXIING OF AN AIRCRAFT ON AN AIRPORT DOMAIN

(75) Inventors: Jean-Claude Mere, Verfeil (FR); Lucille Revertegat, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 33 days.

(21) Appl. No.: 13/303,866

(22) Filed: Nov. 23, 2011

(65) Prior Publication Data

US 2012/0136562 A1 May 31, 2012

(30) Foreign Application Priority Data

Nov. 30, 2010 (FR) ..................................... 10 59927

(51) Int. Cl.

| | |
|---|---|
| ***G06F 19/00*** | (2011.01) |
| ***G05D 1/02*** | (2006.01) |
| ***G08B 21/00*** | (2006.01) |
| ***G01C 23/00*** | (2006.01) |

(52) U.S. Cl.

USPC ............... 701/120; 701/1; 340/958; 340/963; 340/972

(58) Field of Classification Search

USPC ...................... 701/120, 1; 340/958, 963, 972

See application file for complete search history.

(56) References Cited

U.S. PATENT DOCUMENTS

| | | | | |
|---|---|---|---|---|
| 5,323,321 | A * | 6/1994 | Smith, Jr. | 701/428 |
| 5,978,715 | A * | 11/1999 | Briffe et al. | 701/11 |
| 6,314,370 | B1 * | 11/2001 | Curtright | 701/412 |
| 6,366,927 | B1 * | 4/2002 | Meek et al. | 345/442 |
| 6,789,010 | B2 * | 9/2004 | Walter | 701/120 |
| 6,862,519 | B2 * | 3/2005 | Walter | 701/120 |
| 6,920,390 | B2 * | 7/2005 | Mallet et al. | 701/120 |
| 7,089,110 | B2 * | 8/2006 | Pechatnikov et al. | 701/411 |
| 7,222,017 | B2 * | 5/2007 | Clark et al. | 701/120 |
| 7,499,795 | B2 * | 3/2009 | Fetzmann et al. | 701/120 |
| 7,813,845 | B2 * | 10/2010 | Doose et al. | 701/16 |
| 7,974,773 | B1 * | 7/2011 | Krenz et al. | 701/120 |
| 2004/0225432 | A1 * | 11/2004 | Pilley et al. | 701/117 |
| 2005/0283305 | A1 | 12/2005 | Clark et al. | |
| 2009/0150009 | A1 | 6/2009 | Villaume et al. | |

FOREIGN PATENT DOCUMENTS

| | | |
|---|---|---|
| EP | 2131154 | 12/2009 |
| FR | 2924828 | 6/2009 |
| WO | 2009016135 | 2/2009 |

OTHER PUBLICATIONS

French Patent Office, French Search Report FR 1059927, Sep. 1, 2011 (3 pgs).

* cited by examiner

*Primary Examiner* — Thomas Black

*Assistant Examiner* — Tyler Paige

(74) *Attorney, Agent, or Firm* — Wood, Herron & Evans, LLP

(57) ABSTRACT

A method and system for aiding the taxiing of an aircraft on an airport domain enables automatic planning and execution of taxiing. The system includes a trajectory generating device for generating a taxiing trajectory of the aircraft on the airport domain, with the aid of a navigation data base, and piloting aiding devices that use the trajectory for aiding the taxiing of the aircraft. For example, the piloting aiding devices may include an automatic piloting/taxiing device and a display device.

14 Claims, 5 Drawing Sheets

METHOD AND SYSTEM FOR AIDING THE TAXIING OF AN AIRCRAFT ON AN AIRPORT DOMAIN

TECHNICAL FIELD

The present invention relates to a method and a system for aiding the taxiing of an aircraft on an airport domain such as an aerodrome or an airport.

BACKGROUND

The present invention applies to the taxiing of an aircraft such as, particularly, a civil or military airplane, transporting passengers or goods (freight), or a drone (pilotless aircraft). More particularly, it relates to the generation of a trajectory on the ground, which is such that the aircraft can be manually or automatically guided along this trajectory on the airport domain. Furthermore, the method and system for aiding the piloting include, respectively, a method and a device generating such a trajectory.

Within the scope of the present invention, it is meant:

by taxiing, any type of possible running of an aircraft, such as the running on takeoff and landing runways, the taxiways, the turning-around areas, the waiting zones, the stop bars, the stop or stand positions, the maneuvering areas and the parking areas among others; and by trajectory on the ground, the way to be followed by the aircraft on the airport domain, including particularly the takeoff and landing runways, the taxiways, the turn-around areas, the waiting zones, the stop bars, the stop or stand positions, the maneuvering areas and the parking areas.

The path to be followed on the ground is generally given to the pilot, for instance through radio-communication means or through other ordinary means such as a digital data transmission link, by an air traffic controller or a ground controller, but it can also, in some cases, be freely chosen by the pilot.

The path is defined as an element succession on the airport domain, and indicates a way for reaching, from a point or region of the airport domain, another point or region of said domain.

Within the scope of the present invention, it is called by airport domain, any portion of the domain, referred or not as a designation, and identified as a distinct and bounded part of the domain. By element, it is particularly referred to a part or all the surfaces bounding the takeoff and landing runways, the runways, the guiding ways, the taxiway sections, the turn-around areas, the waiting zones, the stop bars, the stand positions, the maneuvering areas and the parking areas.

Within the present invention, furthermore, it is referred as:

a surface element, a polygon bounding and locating at least one part of an element surface (runway, taxiway, . . . ) of the airport domain; and a polyline, a series of lines forming a guiding line.

Furthermore, it is known that airport navigation systems mounted on-board airplanes enables to visualize the airport geometry, and for some of them (such as an OANS ("On board Airport Navigation System") type system, so as to show the current position of the airplane on the airport map displayed on the piloting station. The airport map can be shown on navigation screens or on those of the world being opened according to the applications.

The airport maps are generated from on-board current databases. These databases are formed ordinarily from air images of the airport which are discriminated in different elements (runways, sections of taxiways, guiding lines, . . . ), each element being defined by a set of points and different attributes enabling the on-board system to draw the airport geometry as it is shown on paper maps (Jeppesen type) or scanned in the systems of the EFB ("Electronic Flight Bag") type.

The on-board system will shall have to make do with reading databases, interpreting the information defining the different constitutive elements of the airport, and displaying them by connecting the points by straight lines so as to graphically give back either the surfaces or the guiding lines painted on these elements.

The format definition of these on-board databases has been normalized (standard ED-99B). This definition covers all the map displaying cases, but has not been planned to display trajectories. In particular, the geometry of each element of the airport is precisely and completely described therein, but there is no link between the different elements, so that it is not possible to directly identify, simply by reading the database, a way allowing to go from a given point of the airport to another point while respecting a succession of predefined elements.

In order to try and solve this difficulty, the document WO-2009/016135 describes a method for creating an additional layer, in addition to the current databases, which enables to connect the different elements to the database between them. However, this solution has some disadvantages. In particular, the connectivity layer is defined on the ground on the whole airport surface and is subjected to an additional database which is loaded in the airplane at the same time as the airport database ED-99B, which forces the airline to load a second database of an important size, thus causing an immobilization of the airplane more important than required for the loading of the single airport database.

Other solutions could be envisaged on the base of a new airport database format, which can be discussed within the scope of standardization activities, but may lead to major evolutions of the tools currently used by database providers and may need important investments. Furthermore, such standardization activities are always very long, and the availability of a new standard (ED-99C), taking into account the requirements of any connectivities required for the running trajectory direct generation, could take many years.

The present invention aims at remedying the above mentioned disadvantages. It relates to a method for aiding the piloting of an aircraft, in particular a transport airplane, running on the ground, which comprises a process for generating a taxiing trajectory of the aircraft on the airport domain.

SUMMARY OF THE INVENTION

To this end, according to the invention, the method is remarkable in that:

according to a generation process, a taxiing trajectory of the aircraft on the airport domain is generated from a database through the following steps consisting in:

a) receiving a path comprising a succession of identifiers for the airport domain elements that the aircraft has to follow successively, one element of the airport domain representing a distinct and bounded portion of the airport domain;

b) automatically extracting from the airport database surface elements, that is the whole of the surface elements relating to said element identifier succession for the path that the aircraft has to follow;

c) providing for each extracted surface element, connectivity information relating to the surface elements connected to this one and relating to the whole of the polylines having at least one point in this one, said polylines being extracted from the database;

d) automatically identifying the starting and arrival points of the path;

e) with the aid of the whole of the polylines extracted at step c), automatically determining at least one way connecting the starting and arrival points along at least some of the polylines;

f) automatically converting such polylines being representative of the way into a succession of curves forming a trajectory likely to be followed by the aircraft; and g) providing this trajectory to piloting aiding device; and the piloting aiding device uses this trajectory for aiding the piloting of the aircraft.

Thus, thanks to the invention, the method allows a trajectory to be generated, which can be followed by the aircraft when it has to follow the required path by running on the ground. Such a trajectory on the ground can be provided to a piloting aiding device such as an automatic piloting system which allows to get the aircraft to automatically follow this trajectory. This latter can also be provided to piloting aiding device such as a displaying system likely to generate a visual representation of this trajectory on an appropriate viewing device, this visual representation being likely to be used by the pilot for aiding him to manually guiding the aircraft along the trajectory.

Thus, the present invention proposes to extract from the airport database being used a succession of polylines corresponding to a path to be followed, which is received in particular from a controller, and to convert these polylines in a succession of curves forming a trajectory, likely to be followed by the aircraft and to be used including by a guiding element for an automatic taxiing system.

In particular, for the implementation thereof, the present invention does not need to load on-board the aircraft a second additional database, like the solution recommended by the above mentioned document WO-2009/016135, nor a new airport database standard taking into account connectivity requirements necessary for the direct generation of a running trajectory.

Within the scope of the present invention, the connectivity information includes, for instance, for any surface element (or polygon), all the surface elements (or polygons) which are connected thereto, as well as all the polylines partially or completely included within the surface element, and all the points included in said surface element.

In a first embodiment, at step c), the following operations are implemented consisting in:

c1) automatically performing a connectivity test to check that the surface elements extracted at step b) are connected, that is adjacent two by two, and should this not be the case, if need be, extracting from the airport database at least one auxiliary surface element which is connected both to the surface element which could not be connected and to a following surface element; and c2) automatically extracting from the airport database polylines, that is the whole of the polylines having at least one point in one of the surface elements extracted during the steps b) and c1).

Although not exclusively, the method according to this first embodiment of the invention is applied more particularly to a common airport database according to the ED-99B standard, which allows to remedy the above mentioned disadvantages.

Furthermore, in this first embodiment, advantageously, if at step c1) two successive surface elements are neither connected, nor connectable by an auxiliary surface element, the implementation of the method for generating a taxiing trajectory is even continued.

Moreover, in a second preferred embodiment, at step c), the connectivity information is directly extracted from an appropriate database which comprises, in addition to the surface elements and polylines, at least information indicating, for each surface element, the whole of the surface elements being connected thereto. The description will show thereafter a method for determining such a database comprising connectivity information.

The following features apply to each one of the first and second above mentioned embodiments of the method according to the invention.

Advantageously, for the surface elements extracted from the database, the following operations are performed:

from the whole of the polylines of the database, the polylines which are distant from the considered surface element are eliminated;

for the remaining polylines, for each point of a polyline, the number of intersections between an infinite half-line starting from said point and all the segments defining the contour of the considered surface element is counted; and from the database the whole of the remaining polylines are extracted, having at least one point in the surface element being considered (odd number of intersections).

Additionally, advantageously, at step d), in order to identify the starting and arrival points of the path, when the starting and arrival points are neither explicitly mentioned nor calculated from the aircraft position, each time the whole of the polyline ends located outside the corresponding surface element (that is the first surface element of the path for the starting point, and the last surface element of the path for the arrival point) is considered.

Furthermore, advantageously, at step e):

e1) all the ways linking the starting and arrival points covering the whole of the polylines extracted at step c) are determined, a way being a succession of polylines being interconnected; and e2) the inappropriate ways are eliminated as follows:

for each one of the ways it is checked if the angle between the tangents of two successive polylines of this way is part of a predetermined angle domain, and this for all the successive polylines of the way; and only the ways respecting this condition for all the successive polylines of the ways are taken into account.

Furthermore, advantageously, if at step e), no continuous way linking starting and arrival points has been found, the longest way up to discontinuity is chosen, that is used for the following steps.

Moreover, in a preferred embodiment, at step f), the polylines are converted into a succession of Bezier curves in order to obtain a taxiing trajectory for providing the curvature radius continuity on the whole trajectory.

The use of Bezier curves has a double interest:

on the one hand, these curves lead to a very simple and little bulky modelization in terms of memory size, since they are completely defined with a reduced number of points (so-called control points), as detailed hereunder; and on the other hand, they allow to easily perform the curvature radius continuity on the whole trajectory, which allows to be able to envisage simple solutions for performing an automatic guiding of the aircraft along the trajectory generated from these curves.

The present invention also relates to a system for aiding the piloting of an aircraft, particularly a civil or military transport airplane, taxiing on an airport domain such as an aerodrome or an airport.

According to the invention, the piloting aiding system is remarkable in that it comprises:

- a trajectory generating device for generating a trajectory for taxiing the aircraft in the airport domain, from an airport database, the trajectory generating device comprising:
- a navigation device for receiving a path comprising a succession of identifiers for elements of the airport domain which has to be consecutively followed by the aircraft, one element representing a distinct and bounded portion of the airport domain;
- a database extraction device for automatically extracting from the airport database, surface elements, that is the whole of the surface elements relating to the succession of identifiers for path elements to be followed by the aircraft;
- a connectivity detecting device for providing, for each extracted surface element, connectivity information relating to surface elements connected to this latter and relating to the whole of the polylines having at least one point in this latter, the polylines being extracted from the database;
- a starting and arrival point detecting device for automatically identifying the starting and arrival points of the path;
- a continuous way determining device for automatically determining at least one way linking starting and arrival points, by covering the whole of the extracted polylines;
- a conversion device for automatically converting these polylines into a succession of curves, preferably Bezier curves, which form a trajectory for a simple and robust guiding of the aircraft; and
- a communication device for providing this trajectory to piloting aiding device; and
- the piloting aiding device that uses this trajectory received from the trajectory generating device, for aiding the (manual or automatic) piloting of the aircraft during the taxiing.

In a first embodiment, the connectivity detecting device comprises:

- a connectivity testing device for automatically performing a connectivity test in order to check that the surface elements extracted by the database extraction device is connected, that is adjacent two to two, and should this not be the case, to extract, optionally, from the airport database, at least one auxiliary surface element which is connected both to the surface element which could not be connected and to a following surface element; and
- wherein the database extraction device automatically extracts from the database, polylines, that is the whole of the polylines having at least one point in one of the extracted surface elements.

Furthermore, in a second preferred embodiment, the connectivity detecting device comprises a connectivity extracting device for extracting connectivity information from the database which, in this second embodiment, comprises, in addition to the surface elements and the polylines, at least information indicating, for each surface element, the whole of the surface elements being connected thereto.

The present invention also relates to an aircraft, particularly a transport airplane which is provided with a piloting aiding system, as the above mentioned one.

BRIEF DESCRIPTION OF THE DRAWINGS

The FIGS. of the attached drawing will help to understand how the invention can be implemented. In these FIGS., like reference numerals relate to like components.

Figure 1:
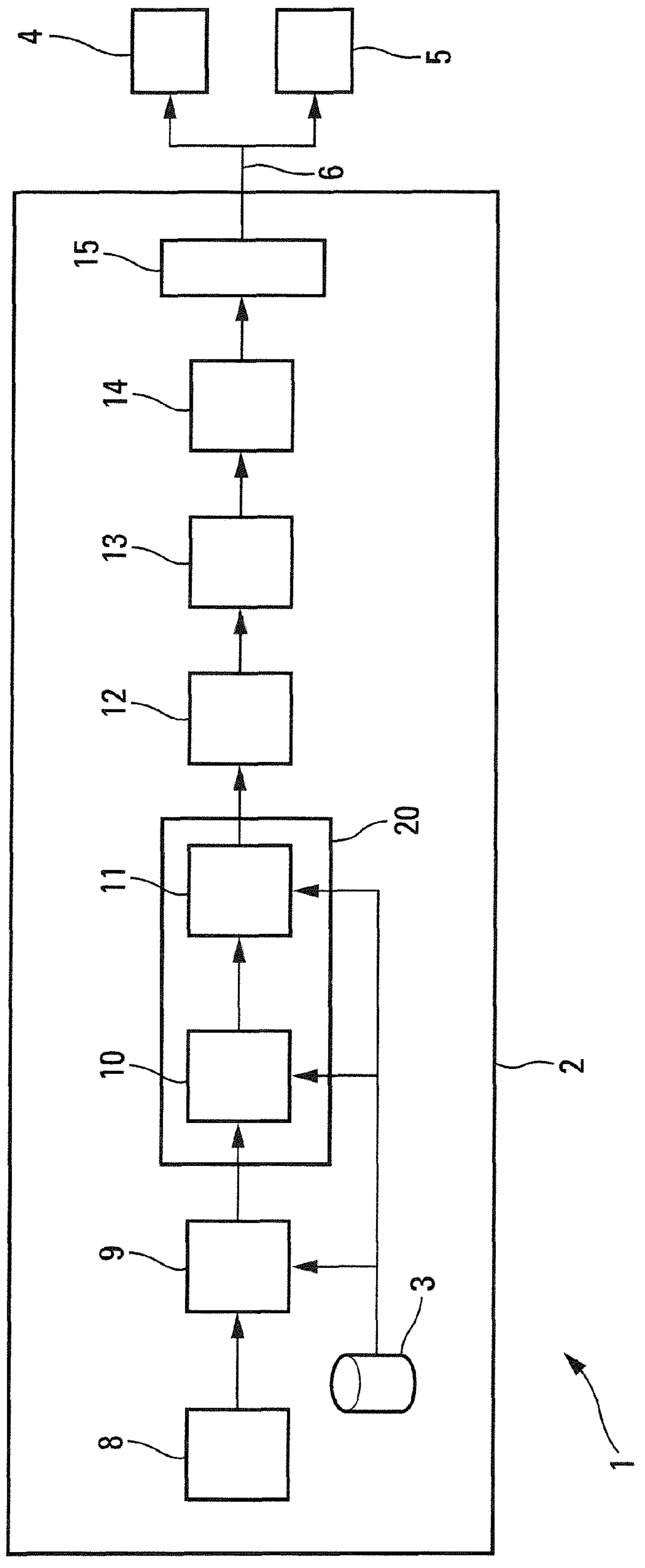
FIG. 1 is a block diagram of a piloting aiding system according to a first embodiment of the invention, which comprises a trajectory generating device.
Figure 10:
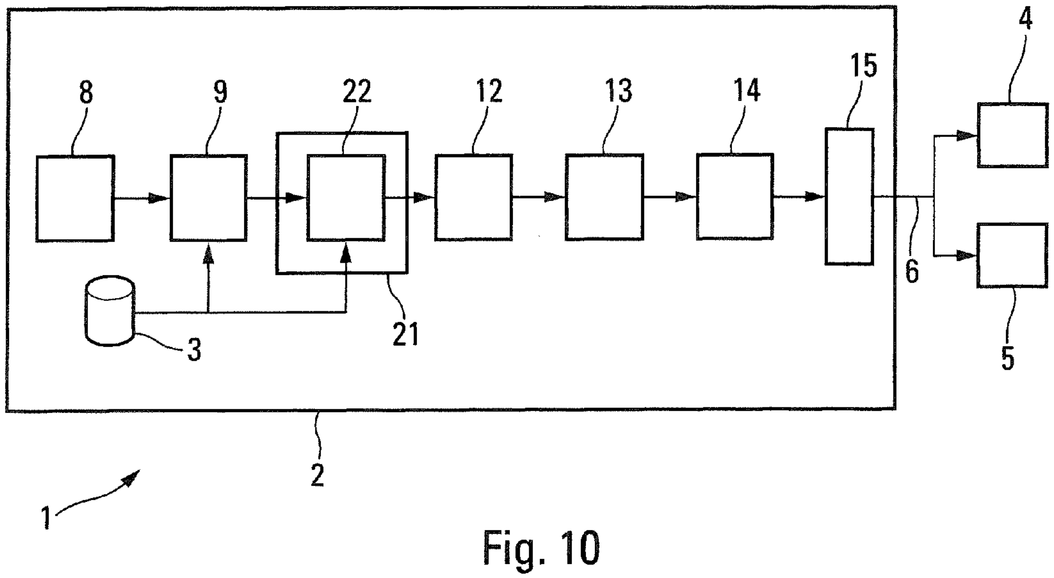
FIG. 10 is a block diagram of a piloting aiding system according to a second embodiment of the invention, which comprises a device for generating a trajectory.

The system 1 according to the invention and schematically shown on FIGS. 1 and 10 aims at aiding the piloting of an aircraft, particularly a transport airplane, taxiing on an airport domain such as an aerodrome or an airport.

According to the invention, the system 1 being on-board the aircraft comprises:

- A trajectory generating device 2 for generating a trajectory for taxiing the aircraft in the airport domain, from information coming from an on-board airport database 3, and
- a pilot aiding device for aiding piloting, which is connected by a link 6 to the trajectory generating device 2, which receives the trajectory determined by this latter and which uses this trajectory for aiding the piloting of the aircraft.

The trajectory generating device 2 is designed for generating a taxiing trajectory which is such that the aircraft can be manually or automatically guided along such trajectory on the airport domain. Thus, this trajectory on the ground shows a way to be followed by the aircraft on the airport domain, comprising particularly the takeoff and landing runways, the taxiways, the turning-around areas, the waiting zones, the stop bars, the stand positions, the maneuvering areas and the parking areas.

According to the invention, the trajectory generating device 2 comprises:

- a navigation device 8 for receiving a path comprising a succession of identifiers of elements of the airport domain that the aircraft has to follow successively. An element (of the airport domain) shows a distinct and delimited portion of the airport domain. Particularly, the word element (of the airport domain) means takeoff and landing runways, taxiways, turning-around areas waiting zones, stop bars, the stand positions, maneuvering areas and parking areas;
- a database extraction device 9 for automatically extracting from the airport database 3, (main) surface elements and more precisely the whole of the surface elements relating to said identifier succession of the elements that the aircraft path ahs to follow. A surface element is a polygon bounding and locating at least one part of the surface of an element (runway, taxiway, . . . ) of the airport domain;
- a connectivity detecting device 20 (detailed hereunder) for providing, for each extracted surface element, connectivity information relating to surface elements connected to this latter and relating to the whole of polylines having at least one point in this latter, the polylines being extracted from the airport database 3. A polyline is a series of lines in a continuous way;
- a starting and arrival point detecting device 12 for automatically identifying starting and arrival points of the path entered through the navigation device 8;

a continuous way determining device 13 for automatically determining the way(s) linking the starting and arrival points by covering the whole of the extracted polylines;

a conversion device 14 for automatically converting these polylines into a succession of curves detailed herein under, in order to form a trajectory for a simple and robust guiding of the aircraft; and a communication device 15 for providing this trajectory to the piloting aiding device 4 and 5 through the link 6.

Thus, the trajectory generating device 2 according to the invention allows a trajectory to be generated which can be followed by the aircraft, when it has to cover the required path by taxiing. This trajectory on the ground can, amongst other things, be provided to piloting aiding device according to the invention allows a trajectory to be generated which can be followed by the aircraft, when it has to cover the required path by taxiing. This trajectory on the ground can, amongst other things, be provided to piloting aiding device such as an automatic taxiing system 4 which allows to get automatically the aircraft to follow this trajectory. This latter can also be provided to piloting aiding device such as a displaying system 5 which is likely to generate a visual representation of this trajectory on an appropriate viewing device such as a displaying system 5 which is likely to generate a visual representation of this trajectory on an appropriate viewing device, this visual representation being usable by the pilot for aiding him to manually guide the aircraft along the trajectory.

The present invention thus proposes to extract from the airport database 3 being used, a succession of polylines corresponding to a path (to be followed) which is received, in particular, from a controller, and to convert these polylines into a succession of curves forming a trajectory, for a simple and robust guiding of the aircraft and which can including be used by an guiding element of an automatic taxiing system 4.

In a first embodiment shown on FIG. 1, the device 20 comprises:

a connectivity testing device 10 for automatically performing a connectivity test in order to check that the (main) surface elements extracted by the database extraction device 9 are interconnected, that is that they are directly adjacent two to two. Should this not be the case, the connectivity testing device 10 extracts, optionally, from the airport database 3, auxiliary surface elements which are connected both to the surface element which has not been connected and to one of the surface elements corresponding to the same identifier or to the following identifier of the path; and the database extraction device 11 automatically extracts from the database 3 the polylines, and more precisely, the whole of the polylines having at least one point in one of the surface elements (main and auxiliary) extracted by devices 9 and 10.

Although not exclusively, this first embodiment (FIG. 1) is applied more particularly to a common airport database 3, according to the standard ED-99B.

Furthermore, in a second preferred embodiment shown on FIG. 10, the connectivity detecting device comprises a connectivity extracting device 22 for extracting connectivity information from the database 3 which comprises, in this second embodiment, in addition to the surface elements E1 to E9 and polylines, at least information indicating, for each surface element, the whole of the surface elements that are connected thereto, the whole of the polylines being partially or completely comprised in the element as well as the points comprised in the element, which allows by direct reading on its airport database 3, to identify the surface elements connected to the surface elements E1 to E9 as well as the whole of the polylines being partially or completely in such surface elements E1 to E9 and those that are connected thereto. According to a generation method detailed hereunder, in this case, the database is completed with the following connectivity information:

for each surface element, a sub-level is added to the database, indicating all the surface elements that are connected thereto;

in case an element has no identifier, one is assigned to it by concatenating the identifiers of all the other elements from the database which are connected thereto; and for each element, a sub-level in the database is added, indicating all the polylines being partially or completely comprised in the element.

The thus completed database allows then the graphic displaying of the airport and includes the connectivity information used by the second embodiment of FIG. 10 to generate the trajectory on the ground. This operation for completing the database can be performed either on the ground, before being loaded in the aircraft, or on-board the aircraft during loading (the database is thus loaded in the ED-99E format, then the aircraft systems convert the database ED-99B before using it in the aircraft).

Consequently, thanks to the trajectory generating device 2 according to the invention:

a representation of the trajectory on the ground to be followed, operable by several systems 4, 5 of the aircraft is available;

this trajectory on the ground allows to provide the pilot with a visual representation of the trajectory to be followed, in order for instance to help him upon the aircraft guiding in manual mode; and this trajectory on the ground allows the implementation of an automatic (or semi-automatic) guiding of the aircraft.

In a particular embodiment, the navigation device 8 can be:

an input device, in particular a keyboard and/or a mouse being associated for instance with a screen, so as to allow an operator, including the aircraft pilot, to enter the path in the trajectory generating device 2, either via a direct manual input or via a graphic input by clicking on the elements of a displayed map; and/or a communication device for automatically receiving as usual from the outside of the aircraft, and including from an air controller or a controller on the ground, the path, for instance through a data transmission link.

Figure 2:
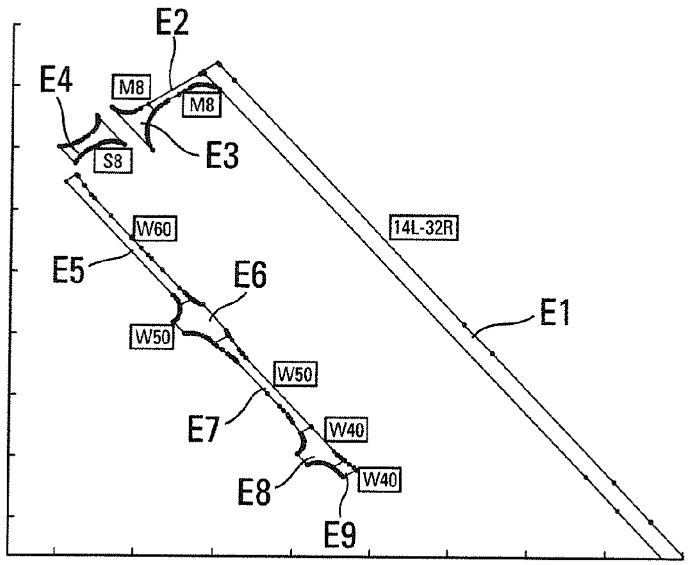
FIGS. 2 to 9 are graphs for explaining the main steps of a method for generating a trajectory according to the invention, implemented by the trajectory generating device of the piloting aiding system according to the invention.

Moreover, the database extraction device 9 extracts from the database 3 surface elements or polygons (runway, taxiway, . . . ), from their names identified in the path (received from the navigation device 8). For illustration, in the example of FIG. 2, the path comprises the succession of identifiers for the following elements of the airport domain (that the aircraft has to follow successively): 14L-32R-M8-S8-W60-W50-W40.

A search is thus performed in the database 3 for each identifier of the path. This search allows to find all the surface elements defined by an identifier (14L-32R, M8, S8, . . . ), that is the surface elements E1 to E9 in the example of FIG. 2.

Furthermore, the connectivity testing device 10 (FIG. 1) performs a connectivity test to check that the surface elements being thus extracted by the the database extraction device 9 is directly adjacent two to two (that is that they have at least two common points) and to put them in order.

Several surface elements can have the same identifier. For illustration, the surface elements E8 to E9 have the same identifier W40 in the example of FIG. 2. It is thus necessary to order these surface elements according to the received path. It is also necessary to check that there is no hole in this path, and that all the surface elements are well connected two to two.

For that, the connectivity testing device 10 checks that each extracted surface element has at least two common points with an other surface element having the same identifier or the identifier that comes after in the path, which allows not only to be sure that the list of the extracted surface elements shows a continuous path, but also to order the list of the surface elements according to the order to be followed so as to cover the path from the first surface element to the last surface element (the surface elements corresponding to a same identifier could be ordered in reverse direction after the extraction operation).

If the above mentioned connectivity test fails (a surface element of the path having no point in common with the elements corresponding to the same identifier or to the identifier coming after in the path), a search in the database 3 is performed, by the connectivity testing device 10, to recover, if any, the surface elements (up to two) connected both to this element as well as to one of the surface elements corresponding to the same identifier or to an identifier coming after in the path.

Figure 3:
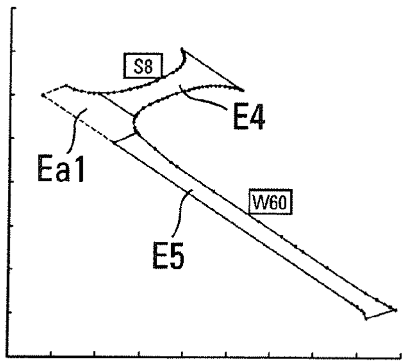

This search aims at forming a continuous sequence of surface elements corresponding to the clearance. For instance, in case a surface element is wrongly or not identified in the airport database 3, the extraction of the surface elements (database extraction device 9) does not come out this element. For illustration, in the example of FIG. 3, the connectivity testing device 10 extracts from the database 3, the surface element Ea1 which has been connected both to the surface element E4 and to the surface element E5 corresponding to the identifier (W60) coming after in the path.

Figure 4:
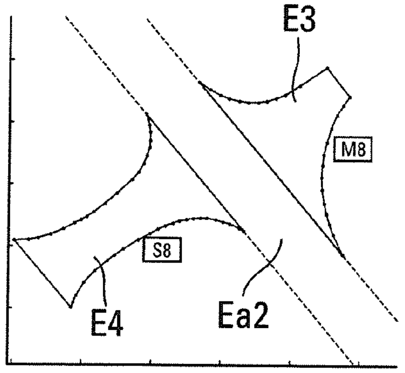

This search also covers the case where the aircraft does only cross a landing runway, as illustrated for instance on FIG. 4 where one takes into account the surface element Ea2 which is connected both to the surface element E3 and to the surface element E4. Indeed, the identifier corresponding to the crossed landing runway is not in the clearance, and the surface element Ea2 defining the landing runway is not recovered during the first extraction step.

If two successive surface elements are neither connected, nor connectable by a third surface element, the connectivity testing device 10 concludes that these two successive elements of the path cannot be connected between them. However, the treatment implemented by the device 2 is followed, without displaying any error messages. Indeed, it is however possible, in certain cases, to recover a way without having necessarily connected all the surface elements to each other.

The database extraction device 11 (FIG. 1) then looks in the database 3, for all the polylines having at least one point in one of the surface elements (or polygons) extracted from database extraction device 9 and connectivity testing device 10.

To this end, the database extraction device 11 performs for each surface element, a first test on the coordinates of the whole of the polyline points, in order to eliminate the polylines being too far from this surface element. Indeed, if no coordinate of the polyline points is in an interval defined by minimal and maximal terminals of the coordinates of the surface element points, the polyline being considered is located outside this surface element.

Figure 5:
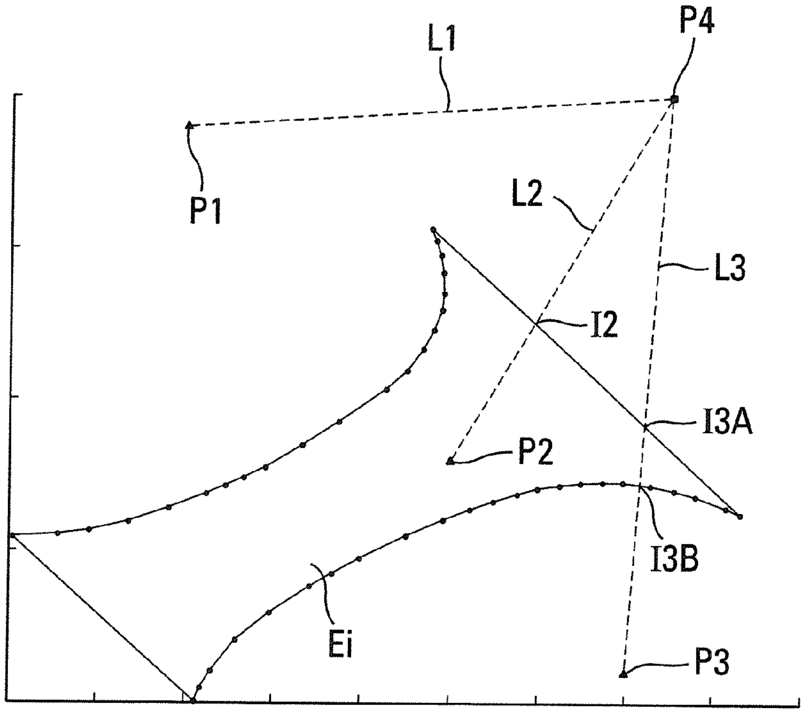
Figure 6:
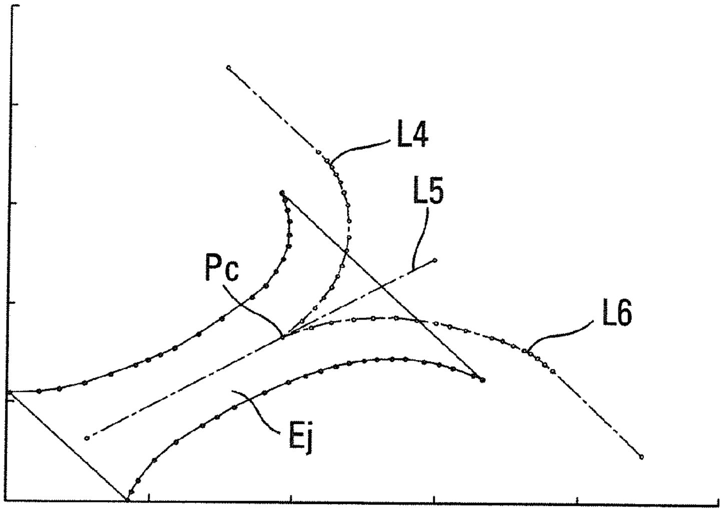
Figure 7:
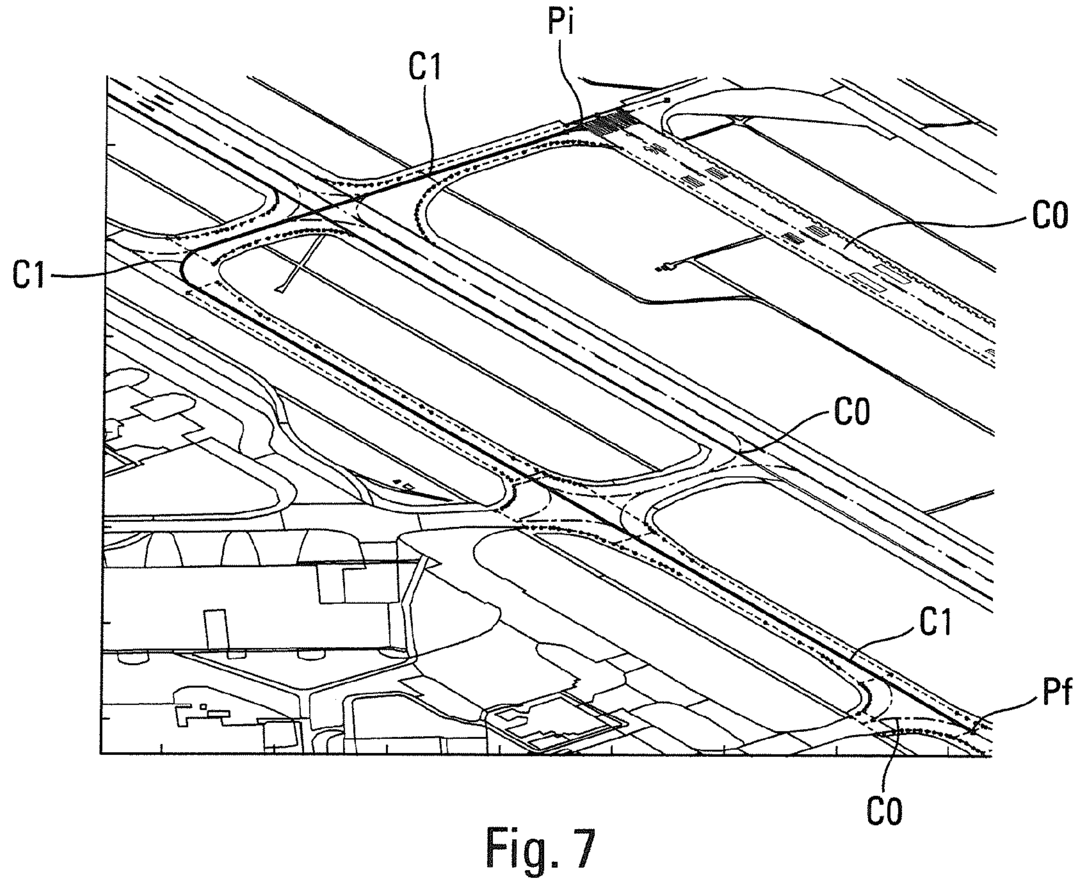

Then, for each point P1, P2, P3 of the remaining polylines, said means device 11 performs a second test consisting in counting the number of intersections between the length L1, L2, L3 linking this point P1, P2, P3 to a fixed point P4 (located away outside the airport area) on the one hand (infinite half-line), and the lengths defining the contour of the surface element Ei on the other hand, as shown on FIG. 5.

If the number of intersections 12 is odd, the point P2 of the length L2 belongs to the considered surface element Ei.

In the opposite case, that is in presence of a number of intersections I3A, I3B pair or nil (for L1), the point P3, P1 is located outside the considered surface element Ei.

At this point of the treatment, the trajectory generating device 2 allowed to recover the whole of the guiding lines connected to surface elements corresponding to the path of the controller.

Furthermore, the starting and arrival point detecting device 12 of the trajectory generating device 2 automatically identifies the starting and arrival points of the path.

To this end, the origin point can be:

A1) explicitly mentioned in the path; or

A2) determined from the aircraft position; or also

A3) determined according to the path.

In the case A2), knowing the aircraft position and the path, a test is being performed by the starting and arrival point detecting device 12 on the polylines located in the surface element where the aircraft is situated. The origin point is then the extreme point of the polyline the closest to the aircraft position.

Furthermore, in the case A3), where determining the origin point from the sole path is looked for, the starting and arrival point detecting device 12 extracts all the polylines L4, L5, L6 having at least one point in the first surface element Ej (element the identifier of which is in first in the path), not completely included in this first surface element Ej, and the origin points are the extreme points, of the previously identified polylines, outside this element. The different possible ways are displayed in dotted line up to the convergence point Pc, for instance by the displaying system 5.

Then, it belongs to the aircraft crew to select the desired way from those thus presented in dotted line (by directly designating it on the map for instance).

Moreover, the starting and arrival point detecting device 12 also identifies the arrival point(s) of the path. As for the origin point, the arrival point can be explicitly mentioned in the path. In the opposite case, the starting and arrival point detecting device 12 proceeds as for the origin point, without however performing the test with respect to the aircraft position. The starting and arrival point detecting device 12 thus extracts the whole of the polylines having at least one point in the last surface element (element the identifier of which is the last in the path) not completely included in the last element of the path, and the arrival points are the extreme points, the polylines previously identified, outside this element. As for the origin point, the different possible ways are displayed in dotted line from the divergence point, for instance by using the displaying system 5.

The continuous way determining device 13 then determines, automatically, the way linking the starting and arrival points defined by the starting and arrival point detecting device 12, by covering the whole of the polylines extracted from the database extraction device 11.

To this end, the continuous way determining device 13:

determines all the ways linking the starting and arrival points covering the whole of the extracted polylines, a way being a succession of polylines interconnected; and eliminates the inappropriate ways (course change test).

The continuous way determining device 13 considers the whole of the ways (succession of polylines) starting from the starting point and the continuous way determining device 13 only shows the ways ending with the arrival point.

Figure 8:
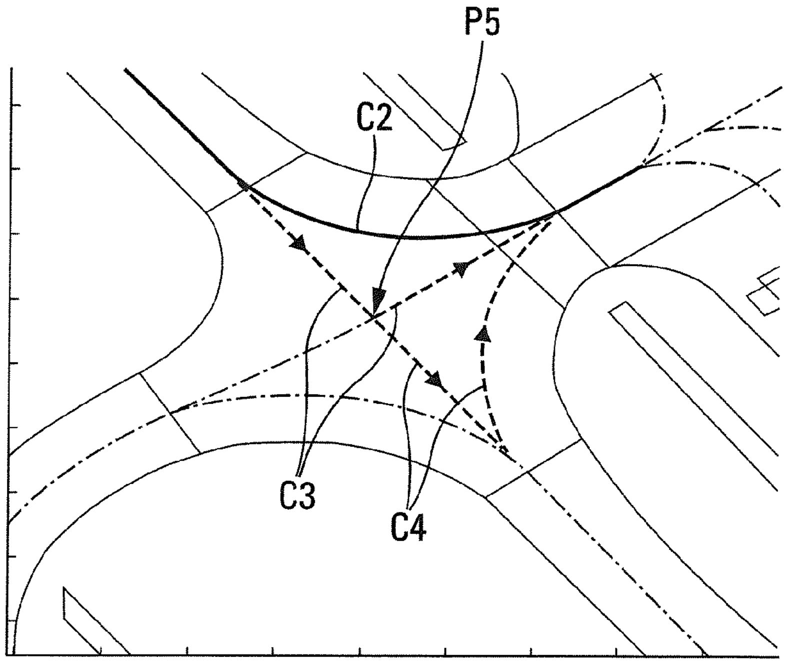

Furthermore, the continuous way determining device 13:

checks, for each of the ways, if the angle between the tangents of two successive polylines of this way is part of a domain of predetermined angles (to check that the succession of these two polylines does not lead to too an important course change of the aircraft), and this for all the successive polylines of the ways. More precisely, the device 13 checks that the angle between the tangents of two successive polylines is not too important. This test allows to eliminate, as shown on FIG. 8, possible ways C3 that pass through the centre P5 of an intersection (instead of following the direct curve C2) or possible ways C4 that cross the intersection and come back by following the symmetrical curve of the C2 allowing to directly respect the path; and only considers the way C2 respecting this condition for all the successive polylines of each way.

The continuous way determining device 13 thus allows to isolate from the whole of the extracted polylines of the base 3, those defining the way to be covered, while checking that these polylines are connected between them (thus that the way is continuous) and that the trajectory can be followed by the aircraft (test on the course change between two polylines).

It should be noticed that even though the surface elements are not all connected between them, nevertheless it is possible to calculate a pathway, since the device 2 is only based on the polylines for the calculation. Thus, if there is no continuous way linking the origin point to the arrival point, the system 1 according to the invention:

gives back the longest continuous way it has found from the starting point (by stopping at the discontinuity level); and in the same way, it gives back the longest continuous way it has found from the arrival point.

Furthermore, the conversion device 14 then converts the polylines T1 (FIG. 9), received from the continuous way determining device 13, in a succession of Bezier curves T2.

To this end, the conversion device 14 calculates, for each polyline, the Bezier curve passing at most through all the points of the polyline. A Bezier curve is a parametric, polynomial curve, defined by check points. For instance, in the case of the Bezier curve of order 3, the curve is defined by four check points PC1, PC2, PC3 and PC4. The check point positions determine the curve pace.

Thus, to provide continuity to the curvature radius along the trajectory, it is necessary to avoid any discontinuity (breakdown) between two consecutive Bezier curves. To this end, the check points must be located on the tangents previously calculated depending on the previous and following polylines.

The extreme check points of the Bezier curves are the extreme points of the polylines defining the pathway.

Figure 9:
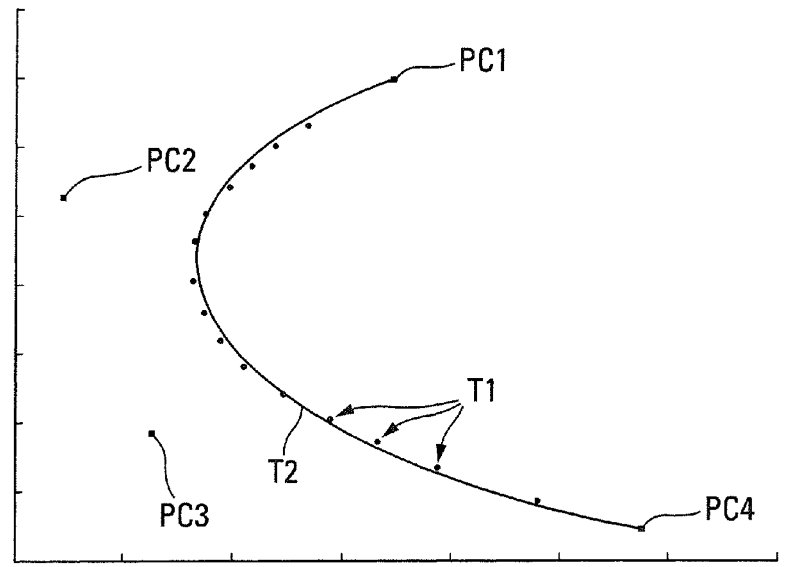

The intermediate check points are determined in an iterative way by varying their position along the tangents at the polyline input and output points in order to minimize the mean quadratic deviation between the corresponding Bezier curve T2 and the points of the polyline T1 (FIG. 9).

The use of Bezier curves has a double interest:

on the one hand, they allow to easily provide the curvature radius continuity on the whole trajectory, which allows to envisage simple solutions for performing an automatic guiding of the aircraft along the trajectory generated from these curves; and on the other part, the mathematical description of this type of curves is simple based on other curves that have the same properties (continuity of the curvature radius).

In order to obtain a database such as used by the system 1 of FIG. 10, a method according to the invention (by way of a corresponding system, not shown) can be implemented to automatically generate new databases, containing connectivity information. Connectivity information between elements, necessary for creating the pathway, are generated from information contained in the current databases, according to the standard ED-99B.

As indicated above, the current databases, defined according to the standard ED-99B, have been foreseen to graphically represent the airports. Effectively, the airport elements defined in these databases are juxtaposed. The on-board system makes do with reading the databases, interpreting the information defining the various constitutive elements of the airport and displaying them for graphically rendering the guiding surfaces or lines. The current databases contain three types of elements:

a polygon: succession of points defining the contour of the airport surface elements, such as the landing runways, the taxiways, . . .

a polyline: succession of points defining the guiding lines painted on the ground (centre lines); and a point: other types of points (reference point of the aerodrome, position of a parking, . . . ).

These elements are defined by their geometry (coordinates of the points bounding the element) and by attributes (identifier corresponding to the identifiers of the airport maps AIP, identification number, type, . . . ).

The method according to the invention depends on the existing databases, defined according to the applying standard ED-99B. As indicated above, several solutions have already been studied, but these solutions are dependent on a new non standard format of databases (thus not available today), which would be optimized to manage the connectivity of the different elements of the airport, thus making the generation of the running trajectory easier.

The principle of the method according to the present invention consists in:

implementing a number of treatments on the current database, to identify the connectivities between elements; and regenerating a database which could be directly used by an on-board application calculating the pathway corresponding to the received clearance.

More precisely, the method according to the invention is a method for generating connectivity information between airport elements:

exploiting data describing polygons, polylines and points, each of such elements being referenced in a database of the aircraft, the data comprising at least a name, a type, a set of points. The polygons show airport surface elements (such as landing runways, segments of taxiways, . . . ); and generating, for any polygon, the connectivity information (all the polygons which are connected thereto, as well as all the polylines partially or completely included in said polygon, and all the points included in said polygon).

According to the invention, the proposed method presents the following steps:

Extraction of the polygons (surface elements) of the database and connectivity test between all the polygons two to two:

from the current database, all the element of polygon type are extracted. For each polygon, the existing or not connectivity is checked with all the other polygons. Two polygons are considered as connected if they have at least two points in common.

In the database and for each polygon, a sub-level indicating all the polygons that are connected to said polygon (its geometry and its attributes, or only the attributes) is added;

Identification of certain not identified polygons:

From all the connectivity information of each polygon, a new identifier can be defined in case the polygons (surface elements) are defined as unknown.

In case a polygon has been identified as unknown, its identifier is determined based on all the identifiers of the polygons to which it is connected. The operation consists then in changing the element identifier (unknown) by concatening the identifiers for all the elements connected in order to be able to extract this element in case the clearance is dependent on one of the connected elements;

Determination of the polygon(s) containing each polyline:

For each point of each polyline, the polygon(s) where it is located is or are determined.

In the database and for each polygon, a sub-level indicating all the polygons partially or completely included in said polygon is added;

Generation of a new database containing the connectivity information, creation of a specific field (of connectivity) in the database:

From the current database, a new database having the same structure including the connectivity information is regenerated.

In the database, for each polygon, a sub-level indicating all the polygons that are connected to said polygon (its geometry and its attributes, or only the attributes) is added).

Moreover, in the database, for each polygon, a sub-level indicating all the polylines partially or completely included in said polygon is added.

The database, thus generated, allows then the graphic display of the airport and provides a number of connectivity information, useful to an algorithm for generating a trajectory on the ground.

This operation, detailed hereinabove, to complete the database can be performed as well on the ground, before being loaded on the aircraft, or on-board the aircraft during loading (the database is then loaded in the format ED-99B, then the aircraft systems convert the base ED-99B before using it in the aircraft).

The invention claimed is:

1. A system for aiding the piloting of an aircraft taxiing on an airport domain, the system comprising:
- a trajectory generating device for generating a trajectory for taxiing the aircraft in the airport domain, from an airport database, the trajectory generating device further comprising:
  - a navigation device for receiving a path, the path comprising a succession of identifiers for surface elements of the airport domain to be followed by the aircraft, each surface element representing a distinct and bounded portion of the airport domain; and
  - a communication device for providing the trajectory to a piloting aiding device;
- a database extraction device for automatically extracting surface elements and a plurality of polylines from the airport database, said airport database containing each of the surface elements relating to the path to be followed by the aircraft;
- a connectivity detecting device for providing connectivity information relating to the extracted surface elements and the extracted plurality of polylines, the connectivity information including which of the extracted polylines connect to or traverse said extracted surface elements;
- a starting and arrival point detecting device for automatically identifying the starting and arrival points of the path;
- a continuous way determining device for automatically determining a continuous way linking the starting and arrival points, the continuous way represented by at least some of the extracted polylines connected to or traversing the extracted surface elements;
- a conversion device for automatically converting the polylines into a succession of curves forming the trajectory to be followed by the aircraft; and
- the piloting aiding devices, wherein the piloting aiding devices include an automatic piloting/taxiing system that automatically actuates the aircraft to follow the trajectory received from the trajectory generating device.

2. The system according to claim 1,
- wherein the connectivity detecting device comprises:
- a connectivity testing device for automatically performing a connectivity test in order to check that each of the surface elements extracted by the database extraction device are connected to at least another surface element, wherein when at least one surface element is not connected to another surface element, at least one auxiliary surface element is extracted by the database extraction device, the at least one auxiliary surface element providing a connection between surface elements which could not be connected; and
- wherein the database extraction device automatically extracts supplemental polylines associated with the at least one auxiliary surface element.

3. The system according to claim 1, wherein the connectivity detecting device comprises a connectivity extracting device for extracting connectivity information from the database, wherein said connectivity information further comprises at least information indicating, for each surface element, the other of the surface elements which are connected thereto.

4. A method for aiding the taxiing of an aircraft on an airport domain, comprising the steps of:
- generating a trajectory for the taxiing of the aircraft on the airport domain from an airport database; wherein generating the trajectory further comprises:
  - a) receiving a path with a navigation device, the path comprising a succession of identifiers for surface elements of the airport domain that the aircraft is to follow, each of the surface elements of the airport domain representing a distinct and bounded portion of the airport domain; and
  - b) automatically extracting the surface elements associated with the path from the airport database;
  - c) extracting a plurality of polylines from the airport database;
  - d) determining connectivity information, the connectivity information including which of the extracted polylines connect to or traverse the extracted surface elements;
  - e) automatically identifying starting and arrival points of the aircraft, the aircraft traversing a continuous way between the starting and arrival points;
  - f) automatically determining the continuous way linking the starting and arrival points, the continuous way represented by at least some of the extracted polylines connected to or traversing the extracted surface elements; and g) automatically converting the polylines representative of the continuous way into a succession of curves forming the trajectory to be followed by the aircraft;

providing the trajectory to a piloting aiding device, the piloting aiding device including an automatic piloting/taxiing device; and automatically actuating the aircraft with the automatic piloting/taxiing device to follow the trajectory received from the trajectory generating device.

5. The method according to claim 4, wherein the determining which of the extracted polylines connect to or traverse the extracted surface elements step further comprises:

c1) performing a connectivity test to determine whether each of the surface elements extracted from the airport database are connected to at least another surface element; and extracting at least one auxiliary surface element which provides a connection between surface elements which could not be connected when at least one surface element is not connected to another surface element; and c2) extracting supplemental polylines from the airport database, the supplemental polylines associated with the at least one auxiliary surface element.

6. The method according to claim 4, wherein the connectivity information of said airport database further comprises at least information indicating, for each surface element, the other of the surface elements that are connected thereto.

7. The method according to claim 4, wherein extracting surface elements from the airport database further comprises:

eliminating polylines which are distant from a considered surface element; and for remaining polylines which completely or partially connect to or traverse the considered surface element, calculating the number of intersections between each point of each remaining polyline and the infinite half-line and each length defining a contour of considered surface element.

8. The method according to claim 4, wherein in order to identify the starting and arrival points of the path, each of the ends of each polyline the polylines, located outside the first and last surface elements of the path, are considered.

9. The method according to claim 4, wherein each of the possible continuous ways linking the starting and arrival points are determined by covering each of the extracted polylines, a way being a succession of polylines connected to each other; and the continuous way being searched is determined and selected amongst the determined continuous ways.

10. The method according to claim 9, further comprising:

for each one of said ways, determining whether an angle between tangents of two successive polylines of said continuous way is part of a predetermined angle domain, wherein only the continuous ways being part of the predetermined angle domain are taken into account.

11. The method according to claim 4, wherein if no continuous way linking starting and arrival points has been found, the method further comprises choosing the longest way up to discontinuity, starting at the starting point and ending at a point being a shortest distance away from the arrival point.

12. The method according to claim 4, wherein the polylines are converted into a succession of Bezier curves which form the trajectory.

13. The system according to claim 1, wherein the piloting aiding devices also include a display device that produces a visual representation of the trajectory on a viewing screen such that a crew of the aircraft can monitor the taxiing of the aircraft.

14. The method according to claim 4, wherein the piloting aiding devices also include a display device, and the method further comprises:

producing a visual representation of the trajectory with the display device on a viewing screen such that a crew of the aircraft can monitor the taxiing of the aircraft.

* * * * *